United States Patent [19]

Hombach et al.

[11] 4,433,095

[45] Feb. 21, 1984

[54] AQUEOUS ADHESIVES CONTAINING WATER-DISPERSIBLE POLYISOCYANATE PREPARATIONS

[75] Inventors: Rudolf Hombach; Helmut Reiff, both of Leverkusen; Wolfgang Wenzel, Bergisch-Gladbach; Manfred Dollhausen, Odenthal, all of Fed. Rep. of Germany

[73] Assignee: Bayer Aktiengesellschaft, Leverkusen, Fed. Rep. of Germany

[21] Appl. No.: 358,077

[22] Filed: Mar. 15, 1982

[30] Foreign Application Priority Data

Mar. 27, 1981 [DE] Fed. Rep. of Germany ....... 3112117

[51] Int. Cl.³ ............................................ C08L 31/04
[52] U.S. Cl. .................................... 524/563; 524/199; 524/552; 524/564; 524/565; 524/575; 524/591
[58] Field of Search ............. 524/552, 563, 564, 565, 524/575, 591, 197, 199; 525/129, 130, 123

[56] References Cited

U.S. PATENT DOCUMENTS 3,931,088  1/1976  Sakurada et al. ........... 260/29.6 RB
3,996,154 12/1976  Johnson et al. ...................... 252/312
4,079,028  3/1978  Emmons et al. ..................... 524/507

FOREIGN PATENT DOCUMENTS 42-12356  7/1967  Japan .
6143280  11/1981  Japan .
1129408  10/1968  United Kingdom .
1417618  12/1975  United Kingdom .
1444933   8/1976  United Kingdom .
1601033  10/1981  United Kingdom .

*Primary Examiner*—Theodore E. Pertilla
*Attorney, Agent, or Firm*—Gene Harsh; Joseph C. Gil

[57] ABSTRACT

The invention relates to aqueous adhesives which are based on water-dispersible polymers and which contain water-dispersible polyisocyanate preparations having an average NCO-functionality of at least 2.2, which, in addition to an aromatic polyisocyanate or a mixture of aromatic polyisocyanates, contain a quantity of emulsifier sufficient to guarantee the dispersibility of the polyisocyanates, as additives capable of improving the bonding properties of these adhesives.

6 Claims, No Drawings

AQUEOUS ADHESIVES CONTAINING WATER-DISPERSIBLE POLYISOCYANATE PREPARATIONS

This invention relates to aqueous adhesives based on water-dispersible polymers which contain certain water-dispersible polyisocyanate preparations as additives.

BACKGROUND OF THE INVENTION

It is known that polyisocyanates can be used as additives for adhesives based on polymers dissolved in organic solvents. Solutions of natural or synthetic rubber or solutions of polyurethane-polyfunctional polyisocyanates have been used for some time to obtain better adhesion to numerous materials to be bonded, greater stability of the bond at elevated temperatures and greater resistance to chemicals. It has now surprisingly been found that it is possible to improve the bonding properties of aqueous adhesives based on water-dispersible polymers by the addition of certain hydrophilically-modified polyisocyanates described herein.

This discovery is surprising because it had been expected that the isocyanate groups of hydrophilically-modified polyisocyanates would react with the water present to form polyureas without influencing the bonding properties of the dispersed polymer. It was also particularly surprising to fluid that, even in the case of adhesive dispersions based on polymers containing very few, if any, active hydrogen atoms, the use of polyisocyanate preparations according to the invention leads to a significant improvement in the bonding properties of these adhesives.

DESCRIPTION OF THE INVENTION

Accordingly, the present invention relates to the use of water-dispersible polyisocyanate preparations having an average NCO-functionality of at least 2.2, preferably of from 3 to 5, and an NCO-content of from 15 to 45%, preferably from 20 to 35%, by weight, containing (a) an aromatic polyisocyanate having an NCO-functionality of at least 3, or a mixture of aromatic polyisocyanates having an average NCO-functionality of at least 2.2 and (b) an emulsifier in a quantity sufficient to guarantee the dispersibility of the polyisocyanates, as additives for aqueous adhesives based on water-dispersible polymers.

The polyisocyanates used as component (a) are aromatic polyisocyanates having an NCO-functionality of at least 3, generally from 3 to 5, or mixtures of aromatic polyisocyanates having an average NCO-functionality of at least 2.2, and preferably from 3 to 5. The emulsifier-free polyisocyanates generally have an NCO content of from 15 to 45%, and preferably from 20 to 35%, by weight. Particularly suitable polyisocyanates are, for example, the polyisocyanates known as "adhesive polyisocyanates", such as 4,4',4"-triphenyl methane triisocyanate or thiophosphoric acid tris-(p-isocyanatophenyl)-ester.

The phosgenation products of aniline/formaldehyde condensates known as polyisocyanate mixtures of the diphenyl methane series, which, in addition to 2,2'-, 2,4'-, and in particular 4,4'-diisocyanatodiphenyl methane, contain varying amounts of higher homologs and have the required NCO-functionality and NCO-content, are also particularly suitable. The content of higher homologs in polyisocyanate mixtures such as these of the diphenyl methane series may, if desired, be increased by distilling off part of the diisocyanates.

Suitable emulsifiers are, in particular, reaction products of aromatic polyisocyanates with polyether alcohols containing non-ionic ethylene oxide units. In addition to the polyisocyanates mentioned above, polyisocyanates suitable for the production of the emulsifiers are any other aromatic diisocyanates including 4,4'-diisocyanatodiphenyl methane, 2,4'- and/or 2,6'-diisocyanatotoluene. The polyether alcohols suitable for use in preparing the emulsifiers include substantially any alkoxylation product of monohydric or polyhydric starter molecules, such as methanol, n-butanol, cyclohexanol, 3-methyl-3-hydroxymethyl oxetane, phenol, ethylene glycol, propylene glycol, aniline, trimethylol propane or glycerol. The polyethers generally contain at least one polyether chain containing at least 10, generally from 10 to 70, and preferably from 15 to 60, ethylene oxide units. The polyether chains present in the emulsifiers generally contain from 10 to 70, and preferably from 15 to 60, alkylene oxide units and are either pure polyethylene oxide chains or mixed polyalkylene oxide chains, at least 60% of whose alkylene oxide units consist of ethylene oxide units. The monohydric polyether alcohols are particularly suitable for use in the production of the emulsifiers. Other suitable (although less preferred) emulsifiers are the corresponding reaction products of aromatic polyisocyanates with mono-, di-, or trifunctional compounds (in the context of the isocyanate-addition reaction) containing isocyanate-reactive groups which, in addition to those isocyanate-reactive groups also contain incorporated hydrophilic centers, such as carboxylate, sulfonate or ammonium groups.

The emulsifiers are produced by reacting the aromatic polyisocyanates with the hydrophilic compounds containing isocyanate-reactive groups, (preferably with the above-mentioned non-ionically hydrophilic polyether alcohols) in an NCO/OH-equivalent ratio of at least 1:1, and generally from 2:1 to about 1000:1. Where polyhydric polyether alcohols are used, it is particularly preferred to adjust the NCO/OH-equivalent ratio to at least 2:1. The emulsifiers may be produced either separately by reacting the above-mentioned starting materials in an NCO/OH-equivalent ratio of from about 2:1 to 6:1, then subsequently mixing the product of this reaction with the component (a) polyisocyanate, or in situ by mixing the aromatic polyisocyanate starting material with the desired quantity of the polyether alcohol to form a polyisocyanate preparation suitable for use in accordance with the invention. Where the emulsifiers are prepared in situ, it is, of course, possible to use a large excess of isocyanate groups within the broad range mentioned above. Generally, however, the quantity of the emulsifier to be mixed with the component (a) polyisocyanate or the quantity of the polyether alcohol added to the polyisocyanate starting material is gauged in such a way that the polyisocyanate preparation ultimately obtained contains from 1 to 12%, by weight, and preferably from 3 to 8%, by weight, ethylene oxide units arranged within polyether chains. Production of the emulsifiers and production of the polyisocyanate preparation is generally carried out at room temperature or at moderately elevated temperature, i.e., at temperatures in the range of from about 20° to 80° C.

According to the invention, the polyisocyanate preparations thus-obtained are processed either as such or in the form of aqueous emulsions having a solids content of from about 10 to 65. These emulsions are prepared just before their use as additives simply by mixing the spontaneously-dispersible polyisocyanate preparations with water.

These polyisocyanate preparations are particularly suitable for modifying aqueous adhesives based on aqueous dispersions which have a solids content of from 10 to 65%, by weight, and preferably from 20 to 60%, by weight, and are selected from the group consisting of natural latex, aqueous dispersions of homopolymers or copolymers of olefinically-unsaturated monomers and aqueous polyurethane dispersions. These dispersions may, of course, also contain the auxiliaries and additives normally used in adhesive technology.

Suitable dispersions of homo- or copolymers of olefinically-unsaturated monomers include, for example, known dispersions of homo- or copolymers based on vinyl esters of carboxylic acids containing from 2 to 18, and preferably from 2 to 4 carbon atoms. Particular examples of these include vinyl acetate, optionally with up to 70%, by weight, based on the total quantity of olefinically-unsaturated monomers, of other olefinically-unsaturated monomers and/or homopolymers or copolymers of acrylic acid esters of alcohols containing from 1 to 18, and preferably from 1 to 4 carbon atoms, such as, in particular, acrylic acid methyl, ethyl, propyl, hydroxyethyl or hydroxypropyl esters. The vinyl acetate may additionally, optionally contain up to 70%, by weight, of other olefinically-unsaturated monomers. Also useful are butadiene/styrene copolymers containing from about 20 to 60%, by weight, of butadiene and/or other diene polymers or copolymers, such as polybutadiene, or copolymers of butadiene with other olefinically-unsaturated monomers, such as styrene, acrylonitrile and/or methacrylonitrile and/or aqueous dispersions of polymers or copolymers of 2-chloro-1,3-butadiene. These copolymers of butadiene may optionally also include other olefinically-unsaturated monomers of the type mentioned by way of example above, particularly those having a chlorine content of from about 30 to 40% by weight, and more particularly, of the order of 36%, by weight.

Suitable aqueous polyurethane dispersions include those generally known and described, for example, in U.S. Pat. Nos. 3,479,310, 4,108,814, 4,092,286 and 4,190,566, British Pat. No. 1,076,688 and German Offenlegungsschrift Nos. 2,651,505, 2,732,131 and 2,811,148.

The aqueous adhesives according to the invention may contain the additives and auxiliaries normally used in adhesives, such as fillers, including, for example, quartz powder, quartz sand, highly disperse silica, heavy spar, calcium carbonate, chalk, dolomite or talcum. These fillers, in turn, are often employed together with suitable wetting agents, such as polyphosphates, for example, sodium hexametaphosphate; naphthalene sulfonic acid; ammonium, or sodium polyacrylic acid salts, and are generally added in quantities of from 0.2 to 0.6%, by weight, based on the weight of filler.

Other suitable auxiliaries include, for example, organic thickeners, such as cellulose derivatives, alginates, starch or starch derivatives or polyacrylic acid, which may be used in quantities of from 0.01 to 1%, by weight, based on the adhesive as a whole, or inorganic thickeners, such as bentonites, which may be used in quantities of from 0.05 to 5%, by weight, based on the total weight of the adhesive.

Fungicides, such as phenol and cresol derivatives or organotin compounds, may also be added to the adhesives. These fungicides, which perform a preserving function, are generally used in quantities of from 0.02 to 1%, by weight, based on the total weight of the adhesive.

Tackifying resins, such as natural resins or modified resins, such as colophony esters; or synthetic resins, such as phthalate resins, may also be added to the adhesive mixture.

The polyisocyanate preparations of the instant invention are generally added to the aqueous adhesives in a quantity of from 1 to 20%, by weight, and preferably in a quantity of from 2 to 10%, by weight, based on the weight of the binder. The aqueous adhesives thus-modified are suitable for bonding the same or different materials together. Materials such as wood, paper, plastics, textiles, leather and inorganic materials, for example, ceramics, earthenware or asbestos cement may be bonded with these adhesives.

The addition of the polyisocyanate preparations to the aqueous adhesives in accordance with the invention brings about, in particular, a distinct improvement in the resistance to shearing, resistance to water, as well as to the strength and thermal stability of the bonds.

The invention is further illustrated but not limited by the following Examples in which all the percentages quoted represent percentages by weight.

EXAMPLE 1

In a 3 liter vessel equipped with a stirrer and reflux condenser, 130 g of the compound:

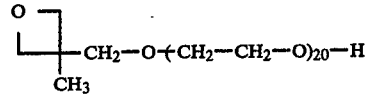

are added all at once, under nitrogen at 40° C., to 1870 g of a polyisocyanate mixture of the diphenyl methane series with an NCO-content of 31% by weight and which contains approximately 60% of diisocyanato diphenyl methane isomers and approximately 40% of higher homologs. After 15 minutes, the temperature of the reaction mixture is increased to 65° C. and is kept at that level for 3 hours. After cooling to room temperature, a polyisocyanate preparation is obtained in the form of a clear, brown solution of the emulsifier formed in situ in excess polyisocyanate. The preparation has an NCO-content of approximately 28%, an average NCO-functionality of approximately 2.5 and a viscosity of 650 mPas (23° C.).

2 g of the polyisocyanate preparation thus-obtained are mixed by hand in a glass beaker with 100 g of an anionic, aqueous polyurethane dispersion on basis of a hydroxyl-polyester, prepared from adipic acid and butane-1,4-diol and toluylene-diisocyanate, having a solids content of 40%. A homogeneous mixture of the components is obtained after about 10 seconds.

Bonds were prepared with this mixture and with the unmodified dispersion in accordance with DIN 53 273. The material to be bonded was a 4 mm thick PVC containing 30% of dioctyl phthalate as plasticizer.

Before the adhesives were applied, the surfaces of the materials to be bonded were cut into strips 15 cm long and 3 cm wide and thoroughly roughened with grade 40 emery tape. The materials, freed from the abrasive dust, are coated with an approximately 0.1 mm thick layer of adhesive. After air-drying for 30 minutes, the adhesive-coated surfaces are heated by radiation for 3 seconds to a temperature of from 80° to 85° C. The surfaces were then brought into direct contact with one another and subjected for 10 seconds to a pressure of 0.4 MPa.

To determine the thermal stability of the bonds, test specimens, which had been stored for 9 days at room temperature, were subjected to a time-based separation test in which the period of time for which the bond withstood a load of 10 N/cm at a temperature of 50° C. was determined. The bond prepared with the unmodified dispersion withstood the load for a period of only 9 minutes. The bond prepared with the dispersion modified in accordance with the invention was still virtually intact after a period of 180 minutes (peel-test).

EXAMPLE 2

2 g of the polyisocyanate preparation described in Example 1 are mixed by hand in a glass beaker with 100 g of an aqueous dispersion of a chloroprene rubber (chlorine content=36%) having a solids content of 58%. After mixing for about 10 seconds, a homogeneous mixture is obtained.

Bonds were prepared with this mixture and with the unmodified latex in accordance with DIN 53 254 and tested for shear strength.

In this test, untreated samples of beechwood were coated with the adhesive. Fifteen minutes after application of the adhesives, two test specimens are brought into contact with one another in such a way that a surface of 2 cm$^2$ is overlapped and are subjected to a pressure of 3.0 MPa for 24 hours. After storage for 9 days at room temperature, shear strength is determined using a tensile testing machine with a spindle feed of 100 mm/min.

In the case of the unmodified latex, the shear strength amounts to 5.0 N/mm$^2$, whereas a shear strength of 9.3 N/mm$^2$ was determined in the case of the latex modified in accordance with the invention.

After bonding, test specimens produced in the same way are stored first for 9 days at room temperature, and then for 24 hours in water at 23° C., before being subjected to the same test in the wet state. In the case of the unmodified latex, a shear strength of 0.4 N/mm$^2$ is determined, whereas, in the case of the latex modified in accordance with the invention, the shear strength is determined to be 3.3 N/mm$^2$.

EXAMPLE 3

2 g of the polyisocyanate preparation according to Example 1 are mixed by hand in a glass beaker with 100 g of an aqueous dispersion of a vinyl acetate/maleic acid/n-butyl ester copolymer having a solids content of 53%. A homogeneous mixture is obtained after mixing for 10 seconds.

The adhesive dispersion thus-obtained is compared with a corresponding unmodified adhesive dispersion by the method described in Example 2. The following shear strengths (N/mm$^2$) were determined.

| | |
|---|---|
| Modified in accordance with the invention stored for 9 days: | 6.7 |
| Unmodified, stored for 9 days: | 3.0 |
| Modified in accordance with the invention, stored in water for 24 hours: | 0.9 |
| Unmodified, stored in water for 24 hours: | 0.1 |

EXAMPLE 4

2 g of the polyisocyanate preparation described in Example 1 are mixed by hand in a glass beaker with 100 g of a dispersion of a copolymer of 85% vinyl acetate and 15% ethylene having a solids content of 50%. A homogeneous mixrure is obtained after mixing for about 10 seconds.

The tests described in Example 2 were carried out, revealing the following shear strengths (N/mm$^2$):

| | |
|---|---|
| Modified in accordance with the invention, stored for 9 days: | 8.8 |
| Unmodified, stored for 9 days: | 5.4 |
| Modified in accordance with the invention, stored in water for 24 hours: | 2.3 |
| Unmodified stored in water for 24 hours: | 0.0 |

EXAMPLE 5

2 g of the polyisocyanate preparation described in Example 1 are mixed by hand in a glass beaker with 100 g of an aqueous dispersion of a copolymer of 55% styrene and 45% butadiene having a solids content of 50% and a Shore-A hardness (based on dry substance) of 48. A homogeneous mixture is obtained after mixing for about 10 seconds.

After storage for 9 days, the performance test described in Example 2 revealed a shear strength of 6.9 N/mm in the case of the modified dispersion and a shear strength of 3.9 N/mm in the case of the unmodified dispersion.

EXAMPLE 6

2 g of the polyisocyanate preparation described in Example 1 are mixed by hand in a glass beaker with 100 g of an aqueous dispersion of a copolymer of 37% acrylonitrile and 63% butadiene having a solids content of 45% and a Defo hardness (based on dry substance) of 1000. A homogeneous mixture is obtained after mixing for about 10 seconds.

The test described in Example 2 revealed the following shear strengths (N/mm$^2$):

| | |
|---|---|
| Modified, stored for 9 days: | 4.6 |
| Unmodified, stored for 9 days: | 1.4 |
| Modified, stored in water for 24 hours: | 1.9 |
| Unmodified, stored in water for 24 hours: | 0 |

What is claimed is:

1. Aqueous adhesives comprising an aqueous polymer dispersion and a water-dispersible polyisocyanate having an average NCO-functionality of at least 2.2 and comprising
   (a) an aromatic polyisocyanate having an NCO-functionality of at least 3 or a mixture of aromatic polyisocyanates having an average NCO-functionality of at least 2.2 and
   (b) an emulsifier produced by reacting aromatic polyisocyanates with hydrophilic compounds containing isocyanate-reactive groups in an NCO/OH-equivalent ratio of at least 1:1, in a quantity sufficient to guarantee the dispersibility of the polyisocyanates.

2. The adhesives according to claim 1, characterized in that component (a) of the water-dispersible polyisocyanate is a polyisocyanate mixture of the diphenyl methane series.

3. The adhesives according to claim 1, characterized in that component (b) of the water-dispersible polyisocyanate is a reaction product of an aromatic polyisocyanate with a monohydric or polyhydric, non-ionic polyalkylene polyether alcohol with at least one polyether chain containing at least 10 ethylene oxide units.

4. The adhesives according to claim 3, characterized in that the polyalkylene polyether alcohol is a monohydric alcohol of the type obtained by alkoxylating a monohydric starter molecule in which the polyether chain consists of 10 to 70 alkylene oxide units of which at least 60% are ethylene oxide units.

5. The adhesives according to claim 1, characterized in that the aqueous adhesive consists of an aqueous dispersion of homopolymers or copolymers of olefinically-unsaturated monomers optionally comprising additives and auxiliaries of the type normally used in adhesives and having a solids content of from 10 to 65%, by weight.

6. The adhesives according to claim 1 or claim 5 characterized in that the polyisocyanate preparation is added to the adhesive in a quantity of from 1 to 20%, by weight, based on the total weight of adhesive.

* * * * *